10R-35
BEST AVAILABLE COPY
Orig 17 Oct 1856 Folding Chair
A. I. Ford
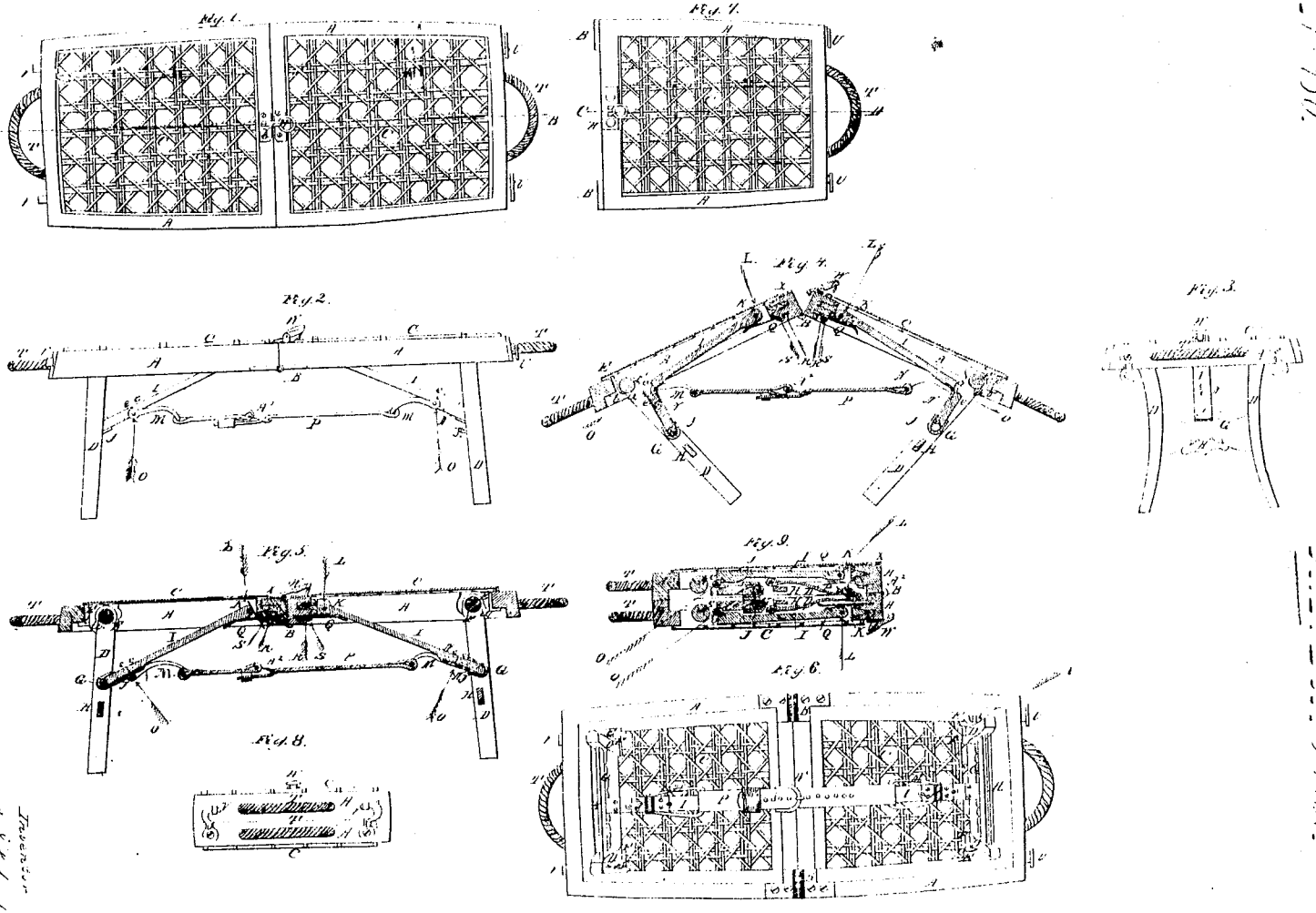
Witnesses
E. N. Scott
Elijah Cutler
Inventor
Zebulon Lyford